United States Patent [19]
Geisel et al.

[11] Patent Number: 5,863,445
[45] Date of Patent: Jan. 26, 1999

[54] ETCHED COIL UNIBODY DIGITAL DETECTOR

[75] Inventors: Karl E. Geisel, Montebello, N.Y.;
Andrew Biscamp, Ridgefield Park;
Brad Conway, Harding, both of N.J.

[73] Assignee: Control Screening L.L.C., Fairfield, N.J.

[21] Appl. No.: 835,029

[22] Filed: Mar. 27, 1997

[51] Int. Cl.$^6$ ....................................................... B44C 1/22
[52] U.S. Cl. ................................ 216/13; 216/20; 216/33; 324/329; 324/149
[58] Field of Search .................................. 216/13, 16, 20, 216/33, 41; 324/326, 329, 76.39, 76.47, 76.82, 99 D, 149

[56] References Cited

U.S. PATENT DOCUMENTS

| | | | |
|---|---|---|---|
| D. 251,363 | 3/1979 | Henault et al. | D10/47 |
| D. 251,364 | 3/1979 | Henault et al. | D10/47 |
| D. 346,977 | 5/1994 | Fiske | D10/47 |
| 2,502,626 | 4/1950 | Mages | 175/183 |
| 3,444,460 | 5/1969 | Penney, Jr. | 324/40 |
| 3,714,563 | 1/1973 | Voll | 324/67 |
| 4,423,377 | 12/1983 | Podhrasky | 324/329 |
| 4,754,469 | 6/1988 | Harding et al. | 378/88 |
| 4,775,435 | 10/1988 | Draeger | 216/13 |
| 4,853,617 | 8/1989 | Douglas et al. | 324/67 |
| 4,862,316 | 8/1989 | Smith et al. | 361/220 |
| 5,055,793 | 10/1991 | Mulcahey | 324/326 |
| 5,325,873 | 7/1994 | Hirshi et al. | 128/899 |
| 5,569,390 | 10/1996 | Endo | 216/13 |

FOREIGN PATENT DOCUMENTS

| | | |
|---|---|---|
| 1299183 | 12/1972 | United Kingdom . |
| 1315684 | 5/1973 | United Kingdom . |

OTHER PUBLICATIONS

Copies of photographs of C.E.I.A. device (Exhs. 1 through 9).

*Primary Examiner*—William Powell
*Attorney, Agent, or Firm*—Walter J. Tencza, Jr.

[57] ABSTRACT

The present invention in one embodiment provides a metal detector comprising a coil, a circuit board on which the coil is etched, a digital signal processor, and a warning circuit, and battery power source. When a sufficient amount of metal is near the coil, the digital signal processor activates a device or devices in the warning circuit. In another embodiment the circuit board on which the coil is placed is used in conjunction with a one piece molded housing. In another embodiment the present invention, provides a metal detector comprising an elongated coil etched onto an elongated circuit board. At least one active device, which is part of detection circuitry is also preferably placed on the elongated circuit board. The detection circuitry in one embodiment, includes circuitry which together with the elongated coil forms an oscillator circuit. The elongated covering case in one embodiment is molded substantially seamlessly by blowmold, extrusion, or injection mold.

19 Claims, 14 Drawing Sheets

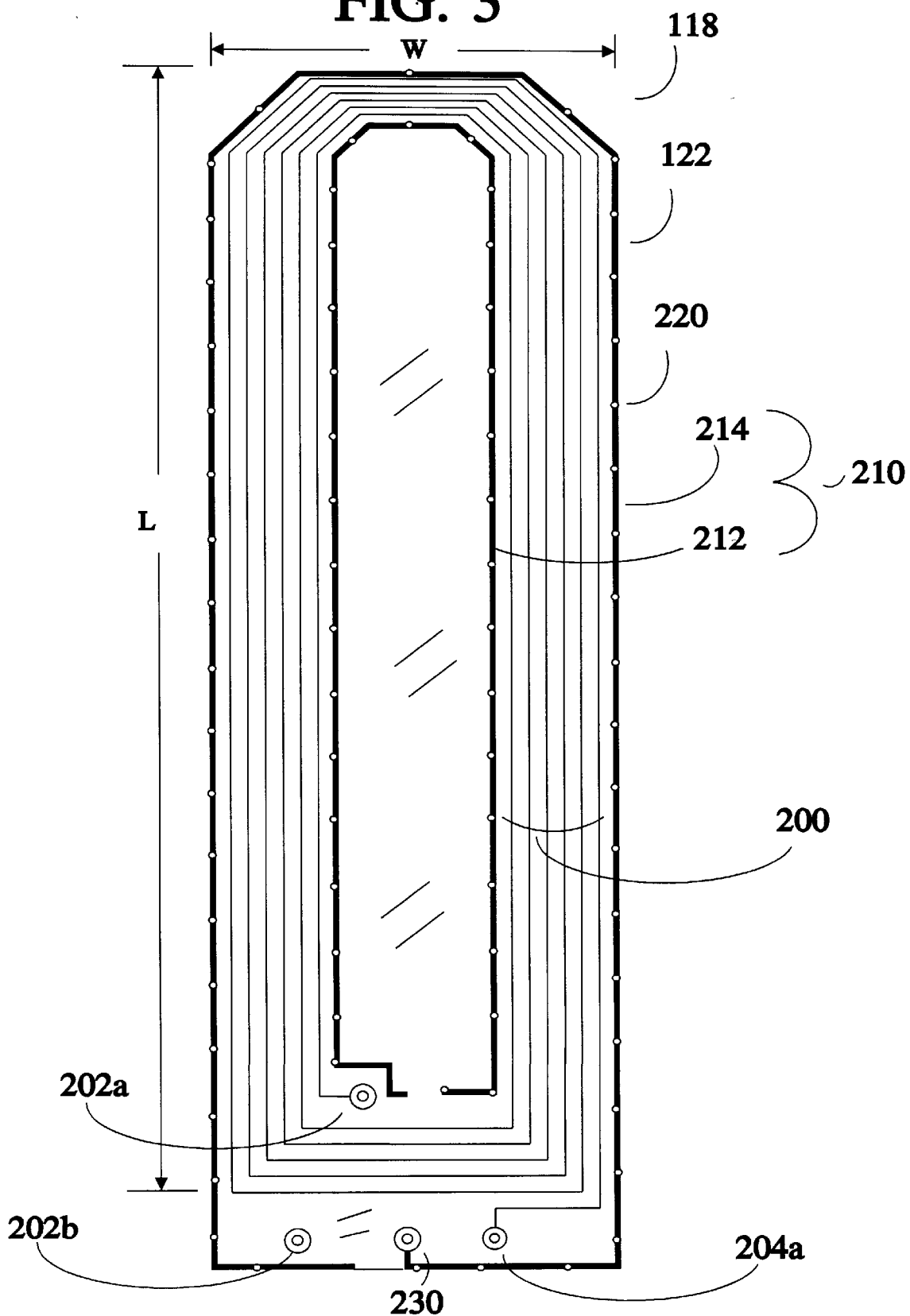

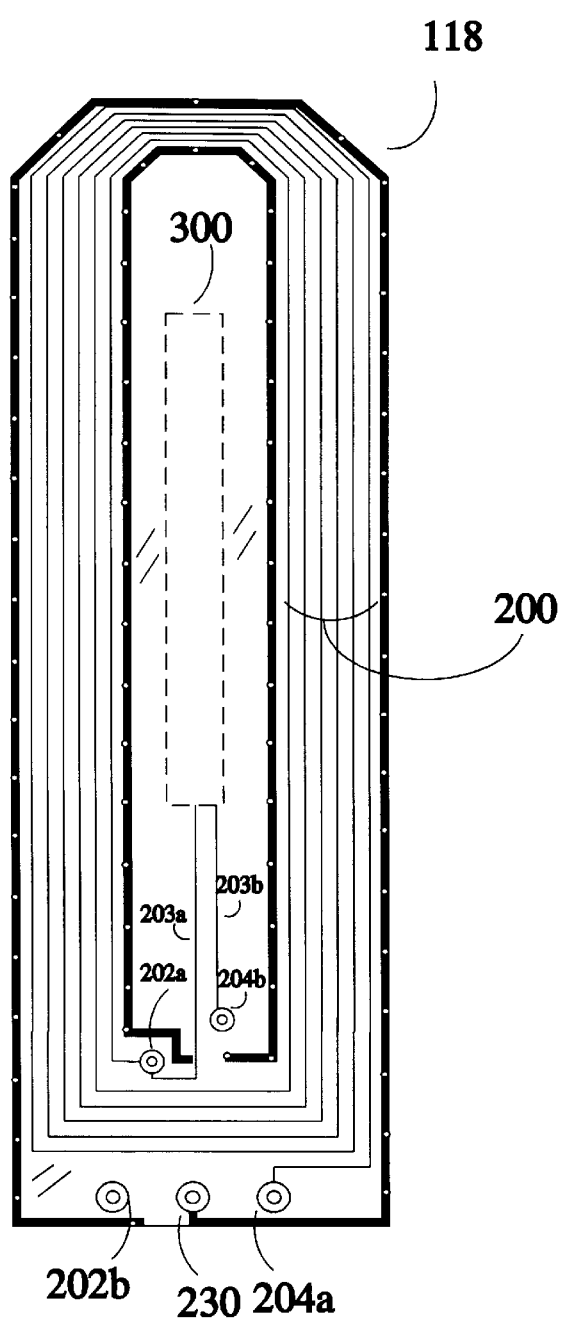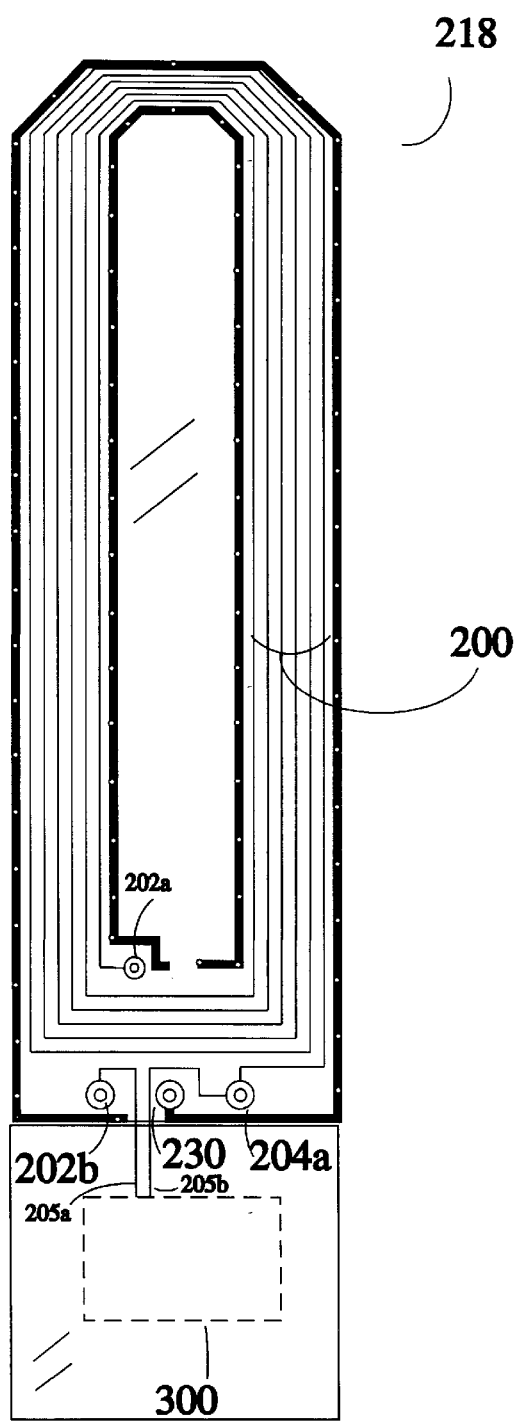

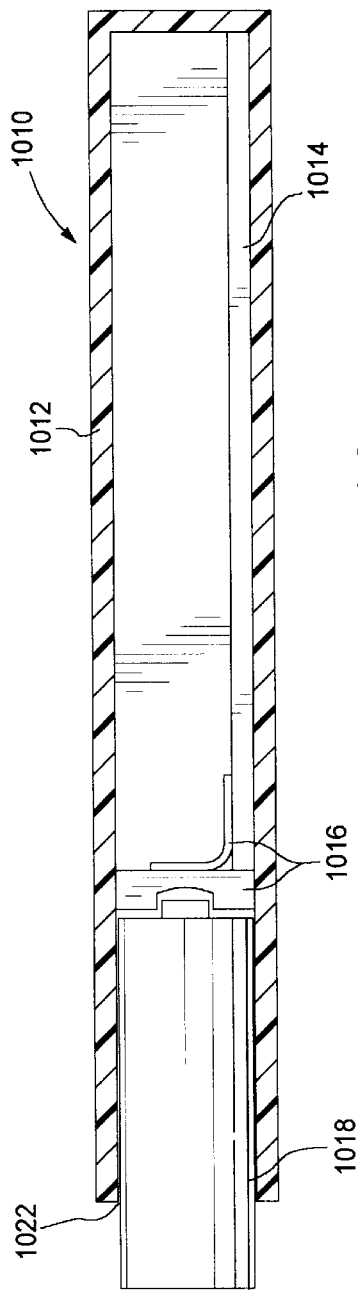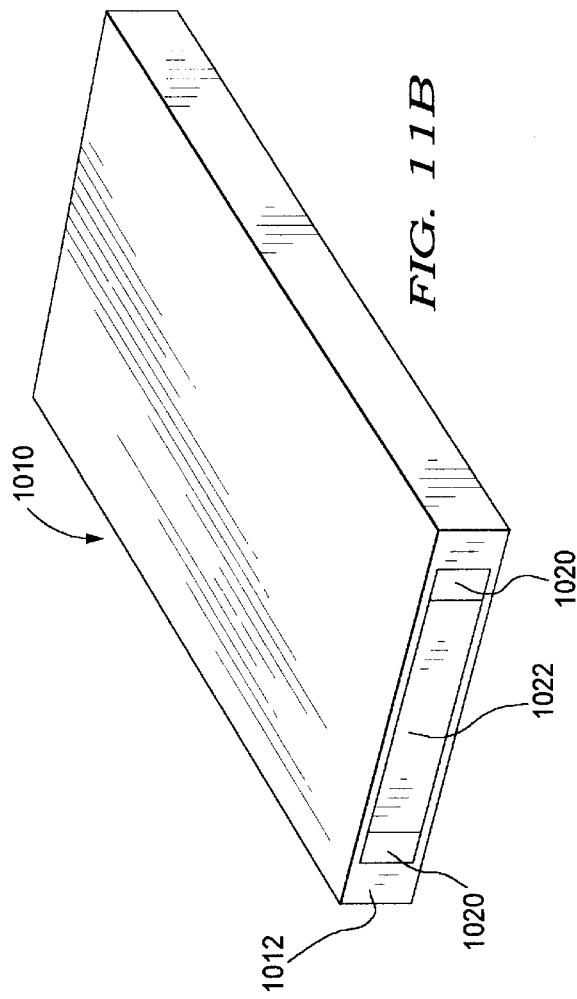

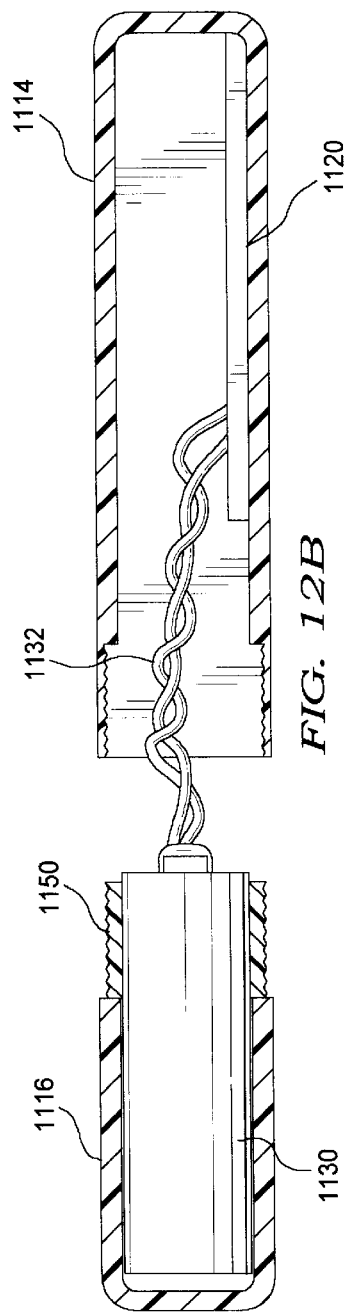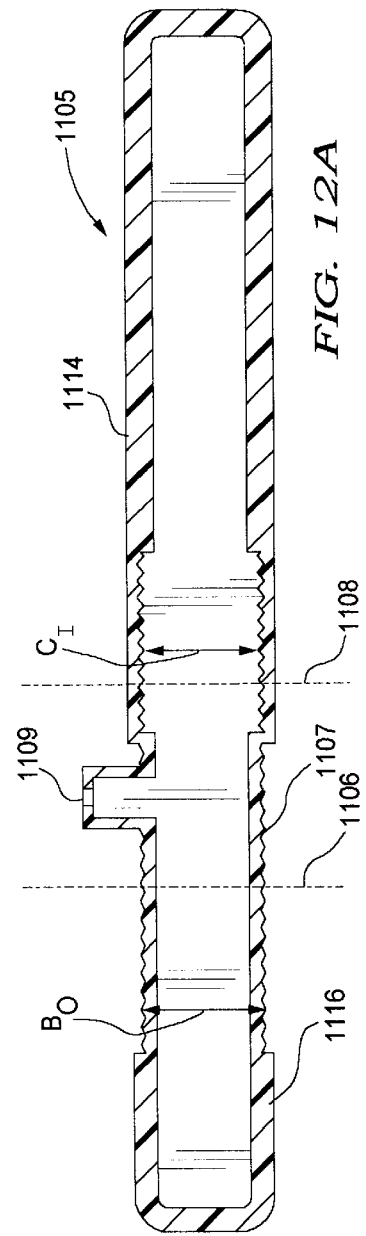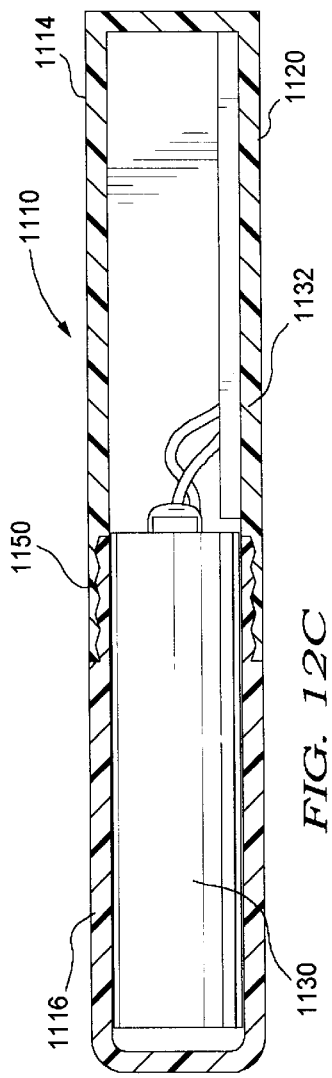

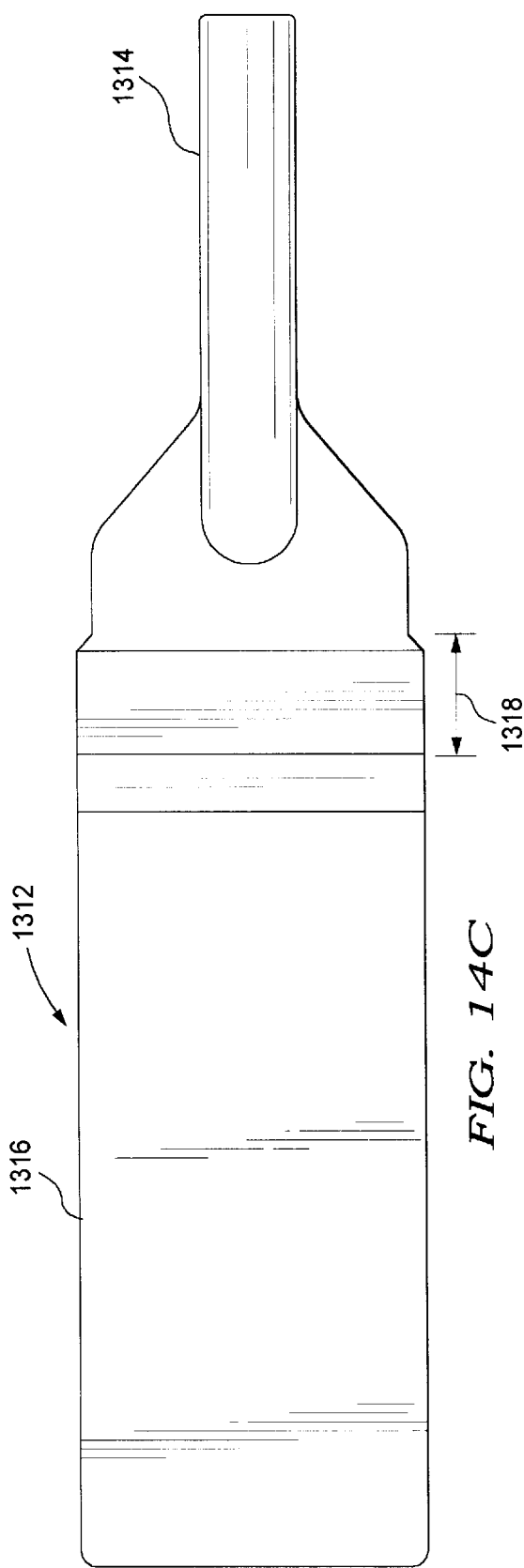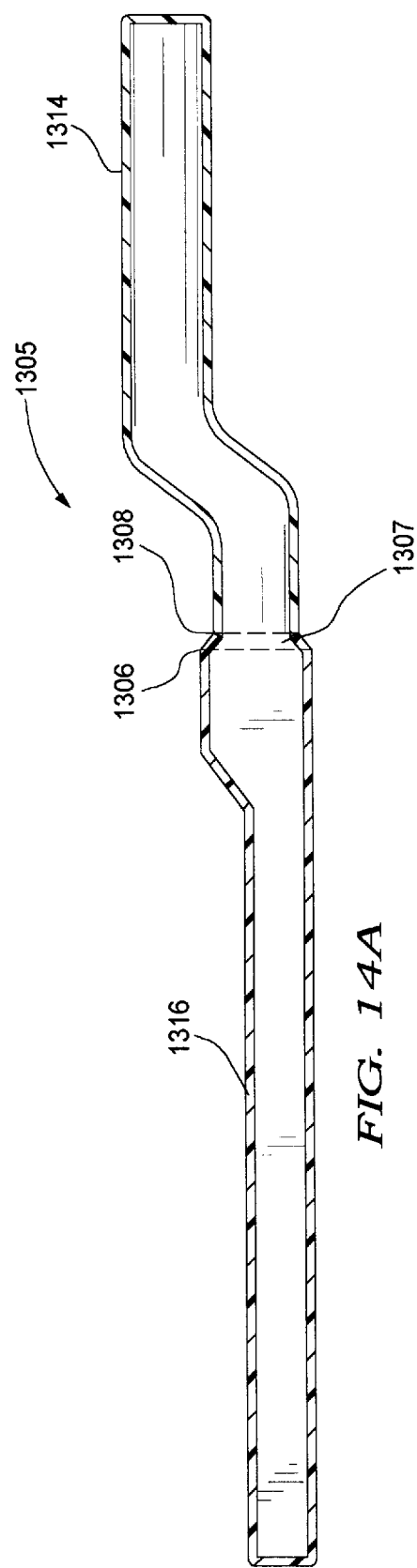

ETCHED COIL UNIBODY DIGITAL DETECTOR

FIELD OF THE INVENTION

This invention relates to the field of metal detectors and more particularly to techniques for providing a coil and detection circuitry and for providing efficient housing for such coil and circuitry.

BACKGROUND OF THE INVENTION

Penney Jr., U.S. Pat. No. 3,444,460 discloses a conductivity probe 10 which is mounted to measure the conductivity of matter such as fluids. A flat spiral coil 26 etched on a circular circuit board 42 is used as the probing element. (Col. 4, lns. 3–60, FIGS. 1–4). An etched shielding 32 is provided on the opposite side of the circuit board 42. (Id.) A coaxial conductor 44 surrounds the coil 26, board 42 and shielding 32. (Id.) The spiral coil 26 is connected by a conductor 50 to measuring circuitry in probe head assembly 14. (Col. 5, lns. 8–13, FIGS. 4–5) The conductivity probe 10 shown in Penney Jr., is adapted for mounting within a pipe structure 20, in which a conducting fluid is located. (Col. 4, lns. 3–18) The coil 26 forms part of a resonant circuit which is driven by a constant current at its resonant frequency. (Col. 5, lns. 13–22) In a vastly different application, Hirschi et al., U.S. Pat. No. 5,325,873, discloses an external probe 10 for detecting resonant circuits 32 and 34 in a feeding tube. (Col. 2, lns. 3–14, col. 4, lns.57–64.) Hirschi et al. specifically discusses a prior art system for detecting a metal object which was not suitable. The external probe 10 includes a circular search head 12 which further comprises a pair of parallel circular circuit boards 15 and 17 each of which contains a coil or coils. (FIGS. 1, 3, and 4) Coil 40, a circular transmitter coil and two receiver D shaped coils, 42a and 42b, are located on circuit board 17, while second circular transmitter coil 41 and two D shaped coils 44a and 44b are located on circuit board 15. (Id., col. 6, lns. 26–47) The coils are designed to produce a null condition when a target is centered. (See col. 6, lns. 48–55)

In the prior art, metal detector wands were injection molded in at least three sections, generally top, bottom and battery cover. This required higher molding costs, many screws to assemble the device and separation with overlap all around the device where the top meets the bottom. This overlap causes poor weather sealing. Metal detector wands are usually comprised of a handle portion and a coil portion. In the prior art a copper magnet wire or ferrite coil assembly was inserted into the coil portion of the metal detector wand. All or some of the detector circuitry was generally placed in the handle portion of the wand.

In the prior art shielding to reject body capacitance and other noise interference would often be added in the form of shielding tape, paint or conduit, often with a grounding wire or tab.

SUMMARY OF THE INVENTION

The present invention in one embodiment provides a metal detector comprising a coil, a circuit board on which the coil is etched, a digital signal processor, and a warning circuit. Embodiments with more than one coil are also contemplated. Shielding is also preferably etched onto the circuit board for grounding. Although a digital signal processor is preferred an analog processor can be employed. The term "digital signal processor" is used in a broad sense to mean any device capable of processing digital signals. The digital signal processor used preferably is a microcontroller.

When a sufficient amount of metal is near the coil the digital signal processor sends a signal to the warning circuit to activate one or more warning devices. The etched nature of the coil provides mechanical stability and reduces cost; the digital signal processor provides accurate detection which is not subject to drifting or as sensitive to temperature, humidity, body capacitance or other factors; and the warning circuit provides the user with an indication that a sufficient amount of metal is present.

Embodiments having separate receiver and transmitter coils are also contemplated. Multiple board layers of coils are also possible. Grounded shielding and circuitry can be provided on one or more layers. It may be preferable for some purposes to use multiple board layers of coils, such as when separate receiver and transmitter coils are used or when many oscillator coil winds are used.

The present invention in another embodiment provides a metal detector comprising an elongated coil and preferably grounded shielding etched onto an elongated circuit board. At least one active device, which is part of detection circuitry, is also preferably placed on the elongated circuit board. The detection circuitry in one embodiment, includes circuitry which along with the elongated coil forms an oscillator circuit. In other embodiments, separate receiver and transmitter coils could be employed on different board layers. The elongated circuit board is especially adaptable to slide or fit into a preferably elongated, molded, and unibody covering case or housing. The covering case or housing are preferably molded such as by blow molding or injection molding.

The elongated covering case typically includes a handle on one end for a user to hold onto. The covering case of the present invention is preferably not injection molded but of course the etched circuit coil or non-etched modular coil can also be fitted in such an injection molded covering case.

The covering case may actually be comprised of two pieces, one for the handle portion and one for the coil portion, which fit together and can be secured together. The present invention includes the method of using one molded piece, cutting that piece into two portions, such as a handle portion and a coil portion, inserting a circuit board, battery, or other components, and then joining the two portions of the covering case together. The two portions can be joined with two or more screws, a metal clamp, or in any other manner.

The above technique of cutting the one molded piece into two pieces allows a wide coil end, yielding better sensitivity, and the narrowest handle for better ergonomics. The circuit board can be glued to foam and pressfit into the case, or may be fixed by screws. A blowmolded, rotationally molded or extrusion molding of the covering case also produces a stronger, seamless, case, since unlike the prior art there is no overlap, but rather from top to bottom a unibody casing.

Preferably the covering case is made from high density plastic resin. Blowmolding is less expensive to make the mold, to mold each case, but permits less detailing. The mold will often last longer than prior art cases. This method can eliminate the need for a separate battery cover. Injection molded cases can also be engineered in a similar manner, at higher cost, to accomodate a coil on board.

The elongated and etched coil is particularly useful for security screening, such as in airports, prisons, and courthouses. The elongated shape allows the coil to quickly scan a person's body and the etched nature provides mechanical stability for the coil. Providing detection circuitry on the same circuit board makes it possible to manufacture a more compact detection device, or to make the handle hollow and of narrower and more ergonomic cross section. It also greatly reduces noise or vibration in the sensitive connection between the coil and the detection circuitry. Providing the ability to slide or fit the board in and out of the elongated covering case allows the easy substitution of an old board for a new board, or a board having one type of coil and detection circuitry with, for a board having another type. In some embodiments of the invention, the etched coil is formed in fatter or rounder configurations for higher sensitivity for certain prison, theft, and law enforcement applications; for ground search of coins, precious metals, mines, shell casings, conduits, wiring and other metal items.

Shielding on a circuit board provides a less expensive, more compact and more uniform method and apparatus for shielding than prior art techniques.

BRIEF DESCRIPTION OF THE DRAWINGS

FIG. 3 is a diagram of the top surface of the printed circuit board in FIG. 2A, showing an etched coil with some ground plain shielding;

FIG. 5 is a diagram of the etched coil of FIG. 3 with detection circuitry shown on the inside of the coil;

FIG. 6 is a diagram of the etched coil of FIG. 3 with detection circuitry shown outside of the etched coil;

FIGS. 11A and 11B is a diagram of an alternative covering case;

FIGS. 12A–12C illustrate another embodiment for an apparatus and method for a covering case;

FIGS. 14A–D illustrate another embodiment of an apparatus and method for a covering case.

DETAILED DESCRIPTION OF THE DRAWINGS

Figure 1:
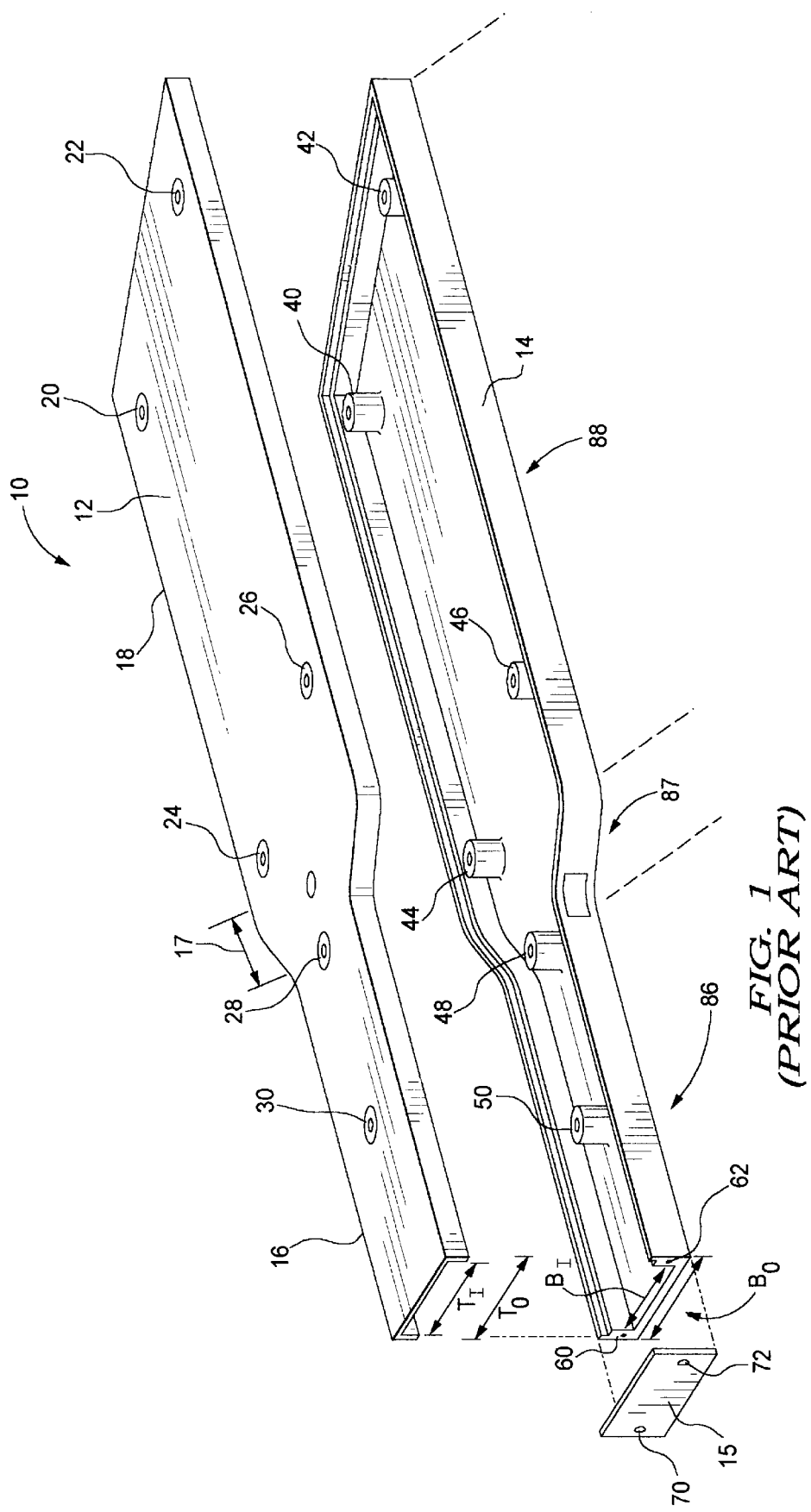
FIG. 1 is a view of a typical prior art plastic case.

FIG. 1 illustrates a prior art covering case 10 for a coil and electronic circuitry for a metal detector. The covering case 10 includes a top portion 12 and a bottom portion 14. The top portion 12 of the covering case 10 has an internal width $T_I$ which is slightly smaller than its outer width $T_O$. The internal and outer width $T_I$ and $T_O$ respectively vary from a fixed smaller width in the handle portion 16 to a gradually increasing width in the transition portion 17, to a fixed larger width in the coil portion 18. The outer width $B_O$ of the bottom portion 14 of the covering case 10 varies in width in a similar manner. The outer width $B_O$, of the bottom portion 14 is made smaller than the internal width $T_I$, of the top portion 12, all along the covering case 10 so that the bottom portion 14 fits within the top portion 12. Thus the top portion 12 overlaps the bottom portion 14. The top portion 12 is then secured to the bottom portion 14 by screws (not shown) which are inserted through holes 20, 22, 24, 26, 28, and 30 and received by threaded receivers 40, 42, 44, 46, 48, and 50 respectively. A battery cover 15 is provided and is secured to the bottom and top portions 12 and 14 by screws being inserted through holes 70 and 72 and received by threaded receivers 60 and 62 respectively.

Figure 2A:
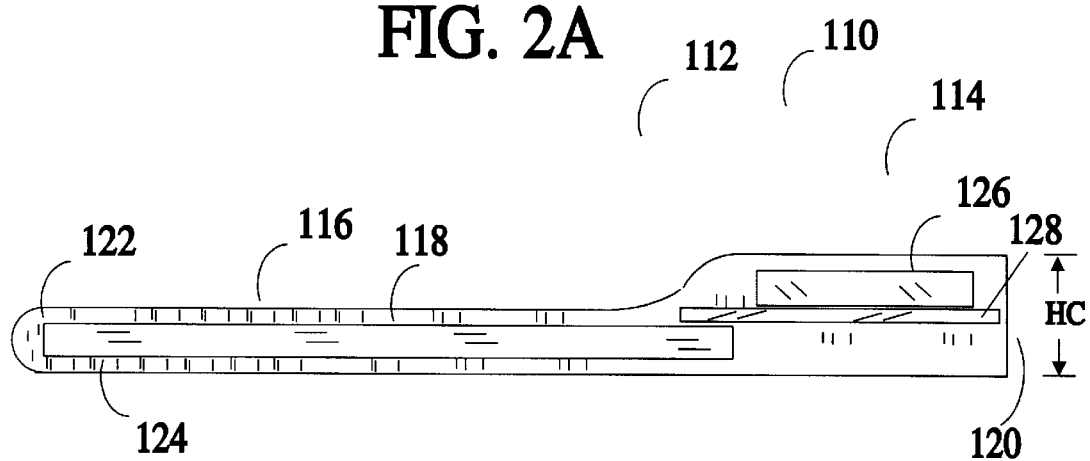
FIGS. 2A–C are views of a covering case and printed circuit board on which a coil is etched.
Figure 2B:
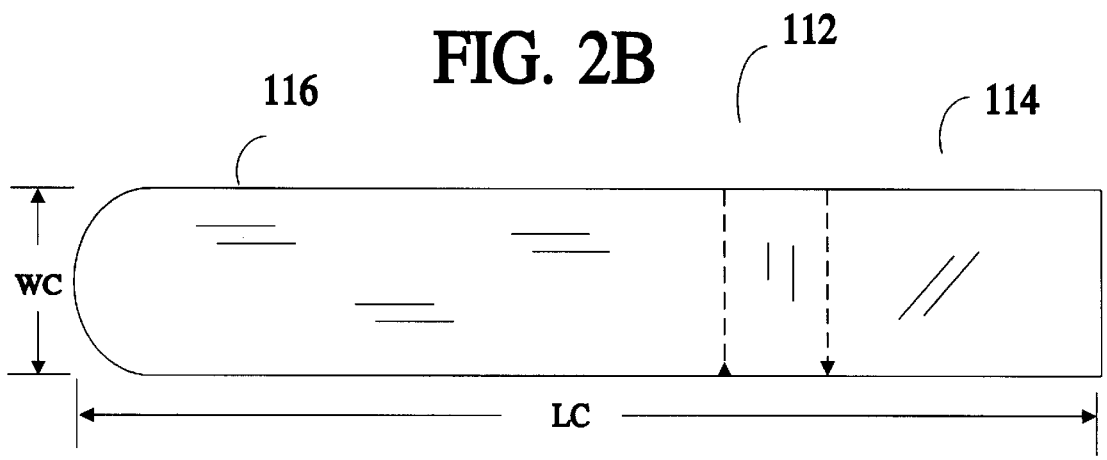
Figure 2C:
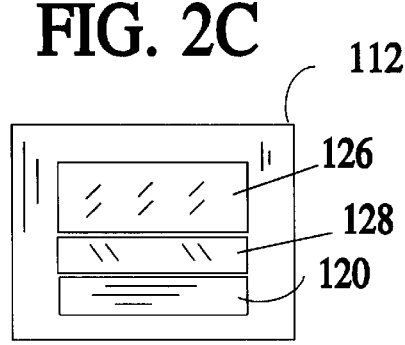

FIGS. 2A, 2B, and 2C illustrate cross sectional, top, and rear views, respectively, of a detector 110 in accordance with the present invention. The detector 110 is comprised of an elongated covering case 112, an elongated circuit board 118, and a battery 126. The circuit board 118 is preferably thin. The covering case 112 is typically comprised of two sections, a handle 114, and an elongated or body portion 116. The covering case 112 also includes an opening 120, shown in FIG. 2C, which is adapted for sliding or placing the circuit board 118 into the covering case 112. Alternatively a covering case may be provided which has a top and bottom half. However, it is preferred that the covering case 112 be constructed of a unibody structure or at least unibody in construction from top to bottom as will be shown in later embodiments. Unlike the prior art of FIG. 1, preferably the covering case 112 is not separated into top and bottom portions with many screws securing the portions together.

After the circuit board 118 is placed into the covering case 112, it can be fixedly mounted by screws, or snapped in place, press fit or glued with foam between the board and the case, or secured by any other means known in the art. The covering case 112 is preferably comprised of one or more parts, or molds. Preferably these one or more molds are not top and bottom portions but rather may preferably be comprised of portion such as the handle portion 114 and the elongated or body portion 116. This is more efficient than the prior art covering cases which typically required three or four molded parts, including top and bottom portions, as shown in FIG. 1, usually made using injection molding. Foam 128 is preferably placed between the battery 126 and the circuit board 118 as shown in FIG. 2C. A cover, not shown, may be placed so as to cover the battery 126, opening 120, and foam 128.

The length "LC" of the covering case 112 can be approximately sixteen inches but will vary depending upon the application. Sixteen inches is particularly suitable for security use. The width "WC" of the covering case is typically two to five inches. The covering case 112 may also be rounded or constructed in other shapes and forms, and may be mounted on an elongated pole for ground search. The cross section "HC" of the handle 114 is preferably narrow which is easier if no main circuit board is placed therein. The elongated circuit board 118 may preferably be placed in the elongated circuit portion 116. Handle free pocket models can be made and can be held with the coil end in the palm of the hand. A battery 126 may be placed in the handle 114 as shown in FIG. 2A or the battery 126 may be placed in a midsection between a coil on the elongated circuit board 118 and the handle 114, or between the elongated circuit board 118 which is shortened (not shown) and the handle 114.

Figure 4:
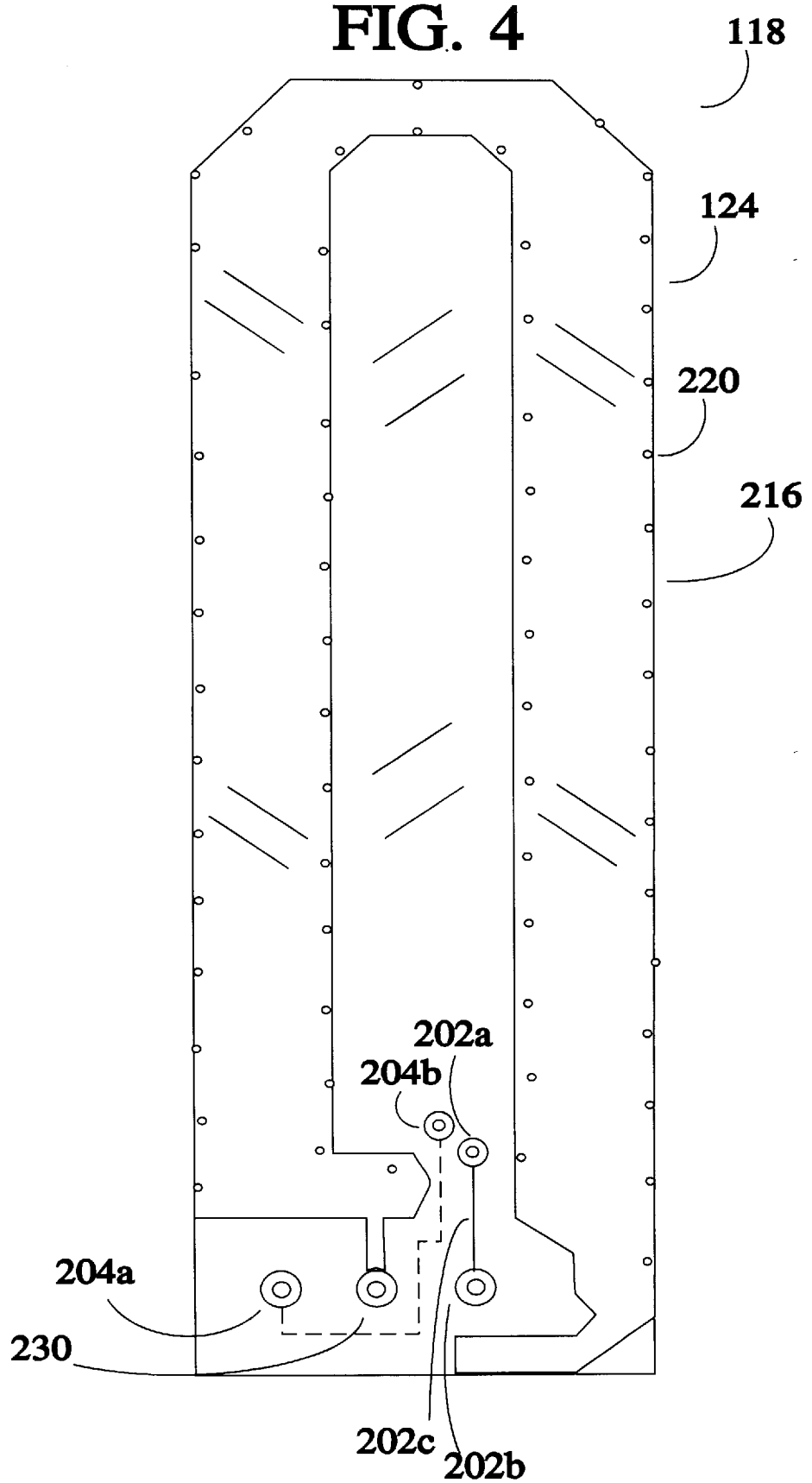
FIG. 4 is a diagram of the bottom surface of the printed circuit board in FIG. 2A with ground plane shielding.

FIGS. 3 and 4 illustrate the top surface 122 and the bottom surface 124, respectively, of the elongated circuit board 118. The elongated circuit board 118 has an elongated coil 200 comprised of six windings, etched on the top surface 122 as shown in FIG. 3. The six windings are preferably placed close together but do not touch each other. Although six windings are shown, any number of windings is contemplated by the present invention. For certain applications many or less windings may be preferred. For other applications many windings may be preferred. The elongated coil 200 can be connected to other circuit elements through its two terminals 202b and 204a. Terminal 202b is connected to elongated coil 200 through conductor 202c and terminal 202a as shown in FIG. 4. Conductor 202c is etched to the bottom surface 124 of the elongated circuit board 118.

The elongated circuit board 118 also has etched on its top surface 122 a middle layer of shielding 210, which comprises an inner shielding 212 and an outer shielding 214. Alternatively, multiple layers can be provided. A bottom layer of shielding 216, shown in FIG. 4, is etched to the bottom layer 124 of the elongated circuit board 118. A top layer of shielding, not shown, may be painted on or omitted on top of the middle layer of shielding 210 and has a pattern which is the horizontal mirror image of the pattern for the bottom layer of shielding 216, in FIG. 4, except the top layer preferably does not have conductor 202c. The top layer of shielding may also be placed on a separate printed circuit board. The middle and bottom layers of shielding 210 and 216, respectively, and the top layer of shielding, not shown, are connected at holes 220 by plated through conductors. The shielding 210 and 216 and the coil 200 are both preferably made of copper which has been etched onto the circuit board 118. The shielding 210 and 216 may also be painted on.

A ground terminal 230 is shown connected to the outer shielding 214 of the middle layer of shielding 210 in FIG. 3. The ground terminal 230 is also shown connected to the bottom layer of shielding 216 in FIG. 4.

The coil 200 in one embodiment is 3.5 inches in width "W" and 10 inches in length "L" as shown in FIG. 3. The circuit board can be fiberglass or any other suitable material known in the art such as a plastic material.

Note that alternatives can be constructed such as multiple layer boards to accommodate extra receiver or transmitter windings or additional shielding.

FIGS. 5 and 6 show various ways in which detection circuitry can be placed in relationship to the elongated coil 200 of the present invention. In FIG. 5, detection circuitry 300 is shown placed inside the inner windings of the elongated coil 200. This enables the production of a smaller detector 110. FIG. 5 is merely an illustration and more space may be necessary for detection circuitry than shown by the dashed lines for detection circuitry 300. The coil 200 in the FIG. 5 illustration may have to be larger to allow for extra circuitry, and an appropriate length of the coil is 9.5 inches. A terminal 204b is provided for the FIG. 5 embodiment. The terminal 204b is connected to the terminal 204a through a conductor on the bottom surface 124 of the circuit board 118, similar to the connection shown between terminals 202a and 202b in FIG. 3. Terminals 202a and 204b are shown connected by conductors 203a and 203b to the detection circuitry 300. Other modifications for the FIG. 5 embodiment may be preferable for implementation, and these will be apparent to those skilled in the art.

FIG. 6 shows an elongated circuit board 218 which is longer than circuit board 118 in order to provide an area outside the coil 200 to place detection circuitry 300. In the FIG. 6 embodiment terminals 202b and 204a are connected by conductors 205a and 205b, respectively, to detection circuitry 300. In both FIGS. 5 and 6 the coil 200 and the detection circuitry 300 preferably lie in the same plane. Preferably the detection circuitry 300 is etched to either circuit board 118 or 218 and on the same side of the circuit board as the etched coil 200. The detection circuitry 300 typically includes one or more active components as will be described in more detail.

Figure 7:
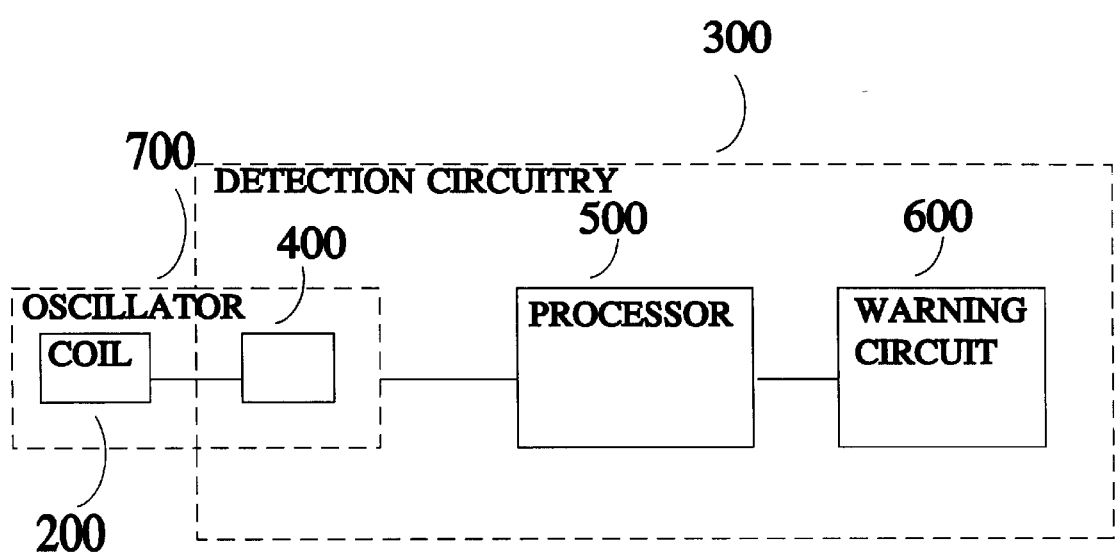
FIG. 7 is a block diagram of the detection circuitry and the etched coil.

A block diagram of detection circuitry 300 electrically connected to elongated coil 200 is shown in FIG. 7. Detection circuitry 300 typically includes the circuit 400, processor circuit 500, and warning circuit 600. Other types of circuits are also common which use separate receiver and field coil windings, which are physically positioned or tuned so as to null out crosstalk. The elongated coil 200 and the circuit 400 together comprise an oscillator 700. The coil 200 alternatively may comprise separate receiver and transmitter windings. The receiver and transmitter windings may be wound opposite to each other and may be on separate boards or separate layers.

In operation, when metal is near the coil 200, the frequency of the oscillator circuit 700 is changed. The frequency change is sensed by the processor circuit 500. If the change exceeds a threshold, the processor circuit activates one or more warning devices in warning circuit 600. Other types of circuitry known in the art can be used, such as circuits which use separate receiver and field coil windings, which are physically positioned or tuned so as to null out crosstalk. The detection and warning circuitry, whether of the oscillator type, the receiver/transmitter type, or otherwise are well known to those skilled in the art.

Figure 8:
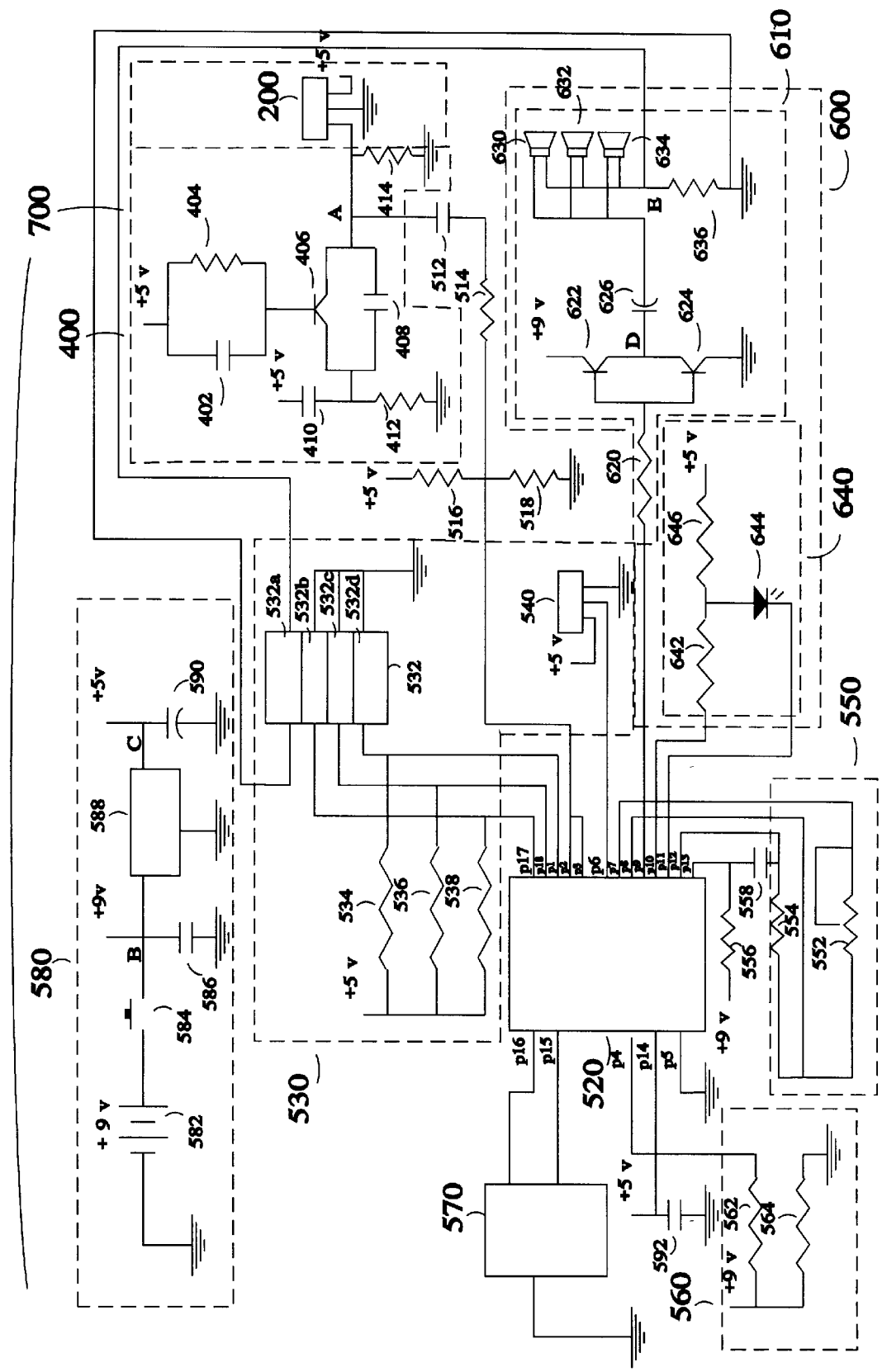
FIG. 8 is a detailed schematic of detection circuitry and a coil in accordance with an embodiment of the present invention.

FIG. 8 is a more detailed schematic of detection circuitry 300 shown connected to the coil 200. The coil 200 and circuit 400 comprise an oscillator circuit 700. The oscillator circuit 700 shown in FIG. 8 includes a capacitor 402 connected in parallel with a resistor 404, the two components connected at one end to a five volt supply and at the other end to the base of a transistor 406. Capacitor 402 has a value of 0.005 microfarads and resistor 404 has a value of 220 kilo ohms. Transistor 406 is preferably a 2N2222A NPN bipolar transistor. The transistor 406 has a capacitor 408 having a value of 0.001 microfarads, connected across its emitter and collector terminals.

The transistor 406 provides amplification and functions as an active device in the oscillator circuit 700. A capacitor 410, having a value of 0.0068 microfarads, is connected at one end to the emitter of the transistor 406 and at the other end to a five volt supply. A resistor 412, having a value of 1 kilo ohm, is connected at one end to the emitter of the transistor 406 and at the other end to ground. A resistor 414, having a value of 100 kilo ohms, is shown connected at one end to node "A" and at the other end to ground. The oscillator circuit 700 is basically a Collpits oscillator where capacitors 408 and 410 determine the frequency of oscillation. Resistors 404, 412, and 414 bias the transistor 406 and capacitor 402 filters out high frequency power supply noise.

The oscillator 700 is connected to processor circuit 500 at node A. The processor circuit includes digital signal processor 520, mode circuits 530, sensitivity circuit 550, power on circuitry 560, system clock 570, and power circuit 580.

The digital signal processor 520 receives the output of oscillator circuit 700, from node "A" after that output has been properly modified by coupling capacitor 512, and resistors 514, 516, and 518. The coupling capacitor 512 eliminates low frequencies and the resistors 514, 516, and 518 set an appropriate D.C. level for the microcontroller or digital signal processor 520. The capacitor 512 and the resistors, 514, 516, and 518 have values of 0.005 microfarads, 24 kilo ohms, 24 kilo ohms, and 4.7 kilo ohms respectively.

The digital signal processor 520 has four inputs connected to mode circuit 530. Mode circuit 530 includes Multiple Dip switch 532, comprised of Dip switches 532a, 532b, 532c, and 532d, and jumper 540. The input of Dip switches 532b, 532c, and 532d are connected to one end of pullup resistors 534, 536, and 538 respectively, which are all connected at their other end to a five volt supply. The pullup resistors 534, 536, and 538 each may have a value of 100 kilo ohms. The outputs of Dip switches 532b, 532c, and 532d are connected to ground. When these Dip switches are activated the microcontroller 520 sees a logic "0" at the respective input. When the Dip switch is not activated the microcontroller 520 sees a logic "1" at its input.

The Dip switches are used to set various modes of operation. The Dip switch 532a changes between two volumes for an audio alarm 510. Dip switch 532b changes between high and low sensitivities for detection. Dip switches 532c and 532d are preferably adapted to change between different tones. One of these tones may be a Geiger counter tone where the time period between clicks increases with an increase in metal. A second of these tones may be a ramp tone where a steady tone is generated but the frequency of the tone increases with an increase in metal. The third of these tones may be a two tone where there is an alternation between two tones and the period between alternations increases with an increase in metal.

Jumper 540 is a hardware jumper. If the jumper 540 is connected between +5 volts and the middle pin, the detector 10 is a first model. If the jumper 540 is connected between ground and the middle pin the detector 110 is a second model of detector. In the first model, all dip switches are disabled, and the tone, sensitivity, and volume are at a default setting. In the second mode, the DIP switch is enabled.

Sensitivity circuit 550 includes a potentiometer 552 and a measuring resistor 554. The potentiometer 552, is a 100 kilo ohm potentiometer, which is connected to an input/output of the digital signal processor 520, and the potentiometer 552 can be set by a user to achieve a level of sensitivity for detection of metal. The measuring resistor 554 having a value of 68 kilo ohms, is used to provide a reference resistance. A resistor 556, having a value of 100 kilo ohms, is shown connected to the 9 volt supply and is used for battery detection. A capacitor 558, having a value of 33 nanofarads first discharged by the microcontroller. The microcontroller then charges capacitor 558 through resistor 554 and measures the time for the voltage across the capacitor 558 to pass a threshold, to be used as a reference. The digital signal processor 520 then repeats the process but adds potentiometer 552, measures the charge time, and determines the resistance by the difference in the rise times. The same process is used to measure battery voltage using resistor 556.

The power on circuitry 560 includes resistor 562 and 564, which have values of 100 kilo ohms and 10 kilo ohms respectively. One end of resistor 562 is connected to the reset terminal of digital signal processor 520 and the other end is connected to the 9 volt supply. Resistor 564 has one end connected to ground and the other to the 9 volt supply.

The system clock 570 preferably comprises a crystal or a ceramic resonator, which along with the internal oscillator circuit of the digital signal processor 520 preferably generate the clock for the digital signal processor 520.

Power circuit 580 includes a 9-volt battery 582 connected at its output to a first pole of a momentary switch 584. The switch 584 can be replaced by an on/off switch. The second pole of the momentary switch 584 is connected to one end of a capacitor 586, whose other end is connected to ground. The capacitor 586 has a value of 100 nanofarads. The second pole of the momentary switch 584 is also connected to an input of a voltage regulator 588. The output of the voltage regulator 588 is connected to one end of a capacitor 590, whose other end is connected to ground. Capacitor 590 has a value of 6.8 microfarads. A Capacitor 592 is connected at one end to ground and at its other end to the five volt supply and to an input of the digital signal processor 520. The capacitor 592 has a value of 0.1 microfarads and is used for basic power supply bypassing for the digital signal processor 520 as known in the art.

After the momentary switch 584 is closed a nine volt supply is provided at node "B" and a 5 volt supply is provided at node "C". The capacitors 586 and 588 are needed by the voltage regulator for stability and to improve transient response. The nine volt and five volt supplies are provided to other parts of the detection circuitry 300 and coil 200 as shown.

Warning circuit 600 comprises audio alarm 610 and LED alarm 640. Audio alarm 610 includes resistor 620, having a value of 2.8 kilo ohms, whose one end is connected to an output of digital signal processor 520 and whose other end is connected to the bases of transistors 622 and 624. The emitter of transistor 622 and the collector of transistor 624 are connected together at node D. The collector of transistor 622 is connected to the nine volt supply. The emitter of transistor 624 is connected to ground. Node D is connected to one end of a capacitor 626, having a value of 22 micro farads. The capacitor 626 filters low frequencies. The other end of the capacitor 626 is connected to the high input of speakers 630, 632, and 634. The low inputs of the those speakers are connected to one end of resistor 636, which has a value of 68 ohms, at node "E". The other end of resistor 636 is connected to ground. Node "E" is also connected to the output of Dip switch 632a. The input of Dip switch 632a is connected to ground.

LED alarm 640 includes a resistor 642 which is connected at one end to an output of the digital signal processor 620 and at its other end to an input of LED 644. The output of LED 644 is connected to an output of digital signal processor 520. The input of LED 644 is also connected to a resistor 646, which is connected at its other end to the five volt supply.

Both one color and two color LEDs 644 can be used for visual alarm. If a single color LED 644 is used, a 1 kilo-ohm resistor 646 is used and the digital signal processor 520 will pulse width modulate the LED 644 to increase the intensity with an increase in the presence of metal. If a two color LED 644 is used, a 150 ohm resistor 642 is used and the digital signal processor 520 will pulse width modulate the LED 644 with alternating polarity to go from green to yellow to red with an increase in the presence of metal. The LED 644 can be provided to become brighter when more metal is present.

In operation, oscillations are continuously produced at Node "A" by the oscillator circuit 700. The oscillations are counted by the digital signal processor 520 and a "no metal present" count is determined. When metal is place near the coil 200 of the oscillator circuit 700, the frequency of oscillation changes. The oscillations are counted and a "metal present" count is determined. If the difference between the two counts exceeds a threshold, the LED alarm 640 and the audio alarm 610 of the warning circuit 600 are activated to indicate that metal has been detected. The LED alarm 640 preferably gets brighter as increasing amounts of metal are detected. The sound of the audio alarm 610 preferably also increases as more metal is detected.

The digital signal processor 520 is preferably a microcontroller, and may be a P1C16C54 microcontroller. Pins p6 through p13 of the digital signal processor 520 comprise an 8-bit bus. Pins p17, p18, p1, and p2 comprise a 4-bit bus. Pin p3 is an input to a real time counter. Pins p16 and p15 are clock inputs for system clock 470. Pins p14 and p5 are voltage supply inputs and p4 is reset input.

The digital signal processor 520 preferably incudes a counter which has a pre-scaler. The pre-scaler allows higher frequencies to be measured with slower and cheaper digital signal processors 520 by dividing down the oscillator frequency so that a slower and cheaper digital signal processor 520 can count the frequency of oscillation. Accurate frequency measurement can be achieved by gating the input to the counter. By using a tri-statable I/O pin on the digital signal processor 520, frequency measurement can be achieved as follows: 1. Output a 1 to pin p2 of digital signal processor 520, which is received by pin p3, and this input disables the counter in the digital signal processor 520, while still allowing the oscillator 700 to oscillate due to resistor 514 and capacitor 512. 2. Reset the counter in the digital signal processor 520. 3. Place p2 of digital signal processor 520 in a high impedance state for an exact period of time to allow the oscillator signal to increment the counter. 4. Output a 1 to p2 of the digital signal processor 520. 5. Read the counter in the digital signal processor 520. 6. Alternate O, 1, to the I/O pin p2 of the digital signal processor, while reading the counter to determine the count in the prescaler. Add the prescaler count to the original count to get the frequency.

A preferred frequency of operation of the oscillator circuit 700, without metal present, is approximately 2 megahertz.

Figure 9:
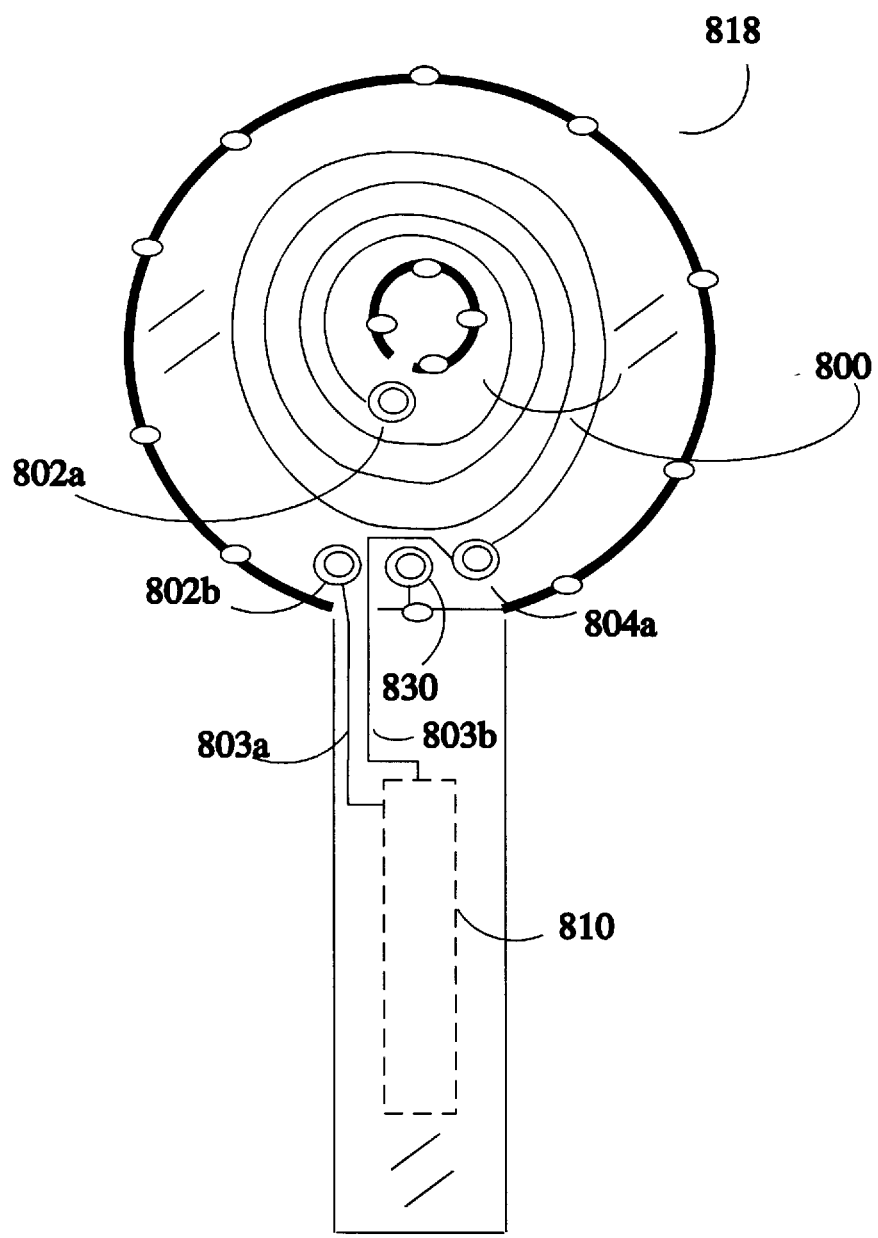
FIG. 9 is a diagram of a rounded etched coil in accordance with another embodiment of the present invention.

FIG. 9 illustrates a rounded etched coil 800 etched on a circuit board 818 in accordance with the present invention. The circuit board 818 has terminals 802a, 802b, 830, and 804a which are analogous to the terminals 202a, 202b, 230, and 204a of FIG. 3. The circuit board 818 includes detection circuitry 810 which is connected to the coil 800. Conductors 803a and 803b connect the terminals 802b and terminal 804a of the coil 800, with the detection circuitry 810. The detection circuitry 810 may be the same as the detection circuitry 300 illustrated in FIG. 8. The dimensions of the circuit board 818 are not to scale and may vary depending upon the application.

Although the detection circuitry, such as detection circuitry 300 of FIG. 8, and coil 200 were discussed by using specific component values, it will be apparent to those skilled in the art that the present invention can be implemented in various forms using various components. In the present application the term "connected" is used in a broad sense and includes operable "connections" between wireless terminals and devices.

Although a rectangular elongated coil 200 has been disclosed in one embodiment, an elongated coil comprised of various coil configurations, including essentially round coil windings for greater sensitivity constructed on a relatively elongated circuit board is contemplated by the present invention. Each coil configuration may have differing sensitivities and other characteristics which can be switched to depending on the application.

Figure 10:
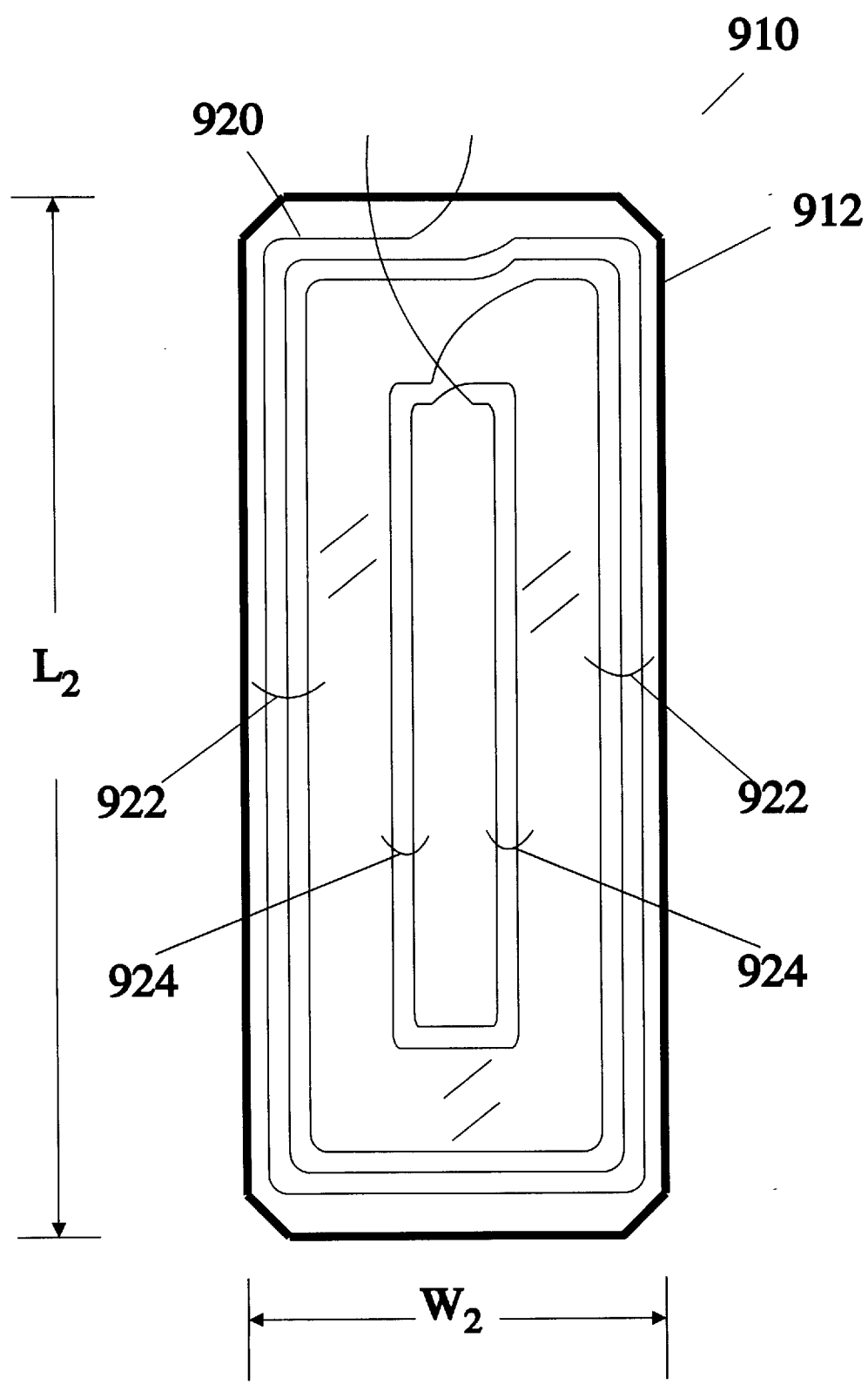
FIG. 10 is a diagram of a coil with an inner portion and an outer portion.

FIG. 10 shows a board 910 and an etched coil 920 in accordance with another embodiment of the present invention. The etched coil 920 has separately inter-spaced co-planar outer winds 922 and inner winds 924. The outer winds 922 are comprised of three winds and the inner winds 924 are comprised of two winds. Various other configurations can be provided. The etched coil 920 can be used with the other components and electronic circuitry shown for FIGS. 1–9. The coil 920 may be not etched, but rather wound as in the prior art. However the etched coil 920 is capable of greater uniformity of detection for both a range of large and small metal objects.

Inter dispersed coil windings such as shown in the embodiment of FIG. 10, are especially inexpensive to effect by etching on a board, where they are easily located and fixed consistently without resorting to glue or epoxy. Nevertheless this more uniform field winding may be included when the coil such as coil 920 is wound discretely. Discrete coil windings embedded in foam or substrate to form a module, when inserted into a one piece coil end of a plastic case, such as a blow molded, roto-molded or extruded case. Such as case is included in connection with coil windings on a circuit board, however the case can be cut for battery access or to allow board insertion, or where the case becomes attached in manufacture to a section which is injection molded or thermoformed. The later cases are intended to be covered where they house board etched metal detector coil windings. The above metal detector windings etched on a circuit board can also be used in another preferred embodiment to replace discrete windings, with or without board shielding, for the sides of a walkthrough security detector or a quality control when positioned on either side of a conveyorized processing line. In this case the side housing can be a wound plastic metal or other similar material.

The width $W_2$ and the length $L_2$ of the coil 910 may be three inches and eight inches, respectively. The inner winds 924 are provided so that there is no dead zone in the center of the coil for small objects. Electronic components can be provided in between the outer winds 922 and the inner winds 924.

FIGS. 11A and 11B are cross sectional and perspective views of a metal detector wand 1010 in accordance with another embodiment of the present invention. Metal detector wand 1010 include covering case 1012, circuit board 1014, battery-board interface 1016 and battery 1018. The circuity of the metal detector wand 1010 may be as previously described with reference to FIGS. 1–10. The battery 1018 protrudes out from the covering case 1012 allowing for the easy insertion or removal of the battery 1018. The covering case 1012 is preferably of unibody construction and can be blow molded, rotomolded, or molded in any other manner. The covering case 1012 as shown in FIG. 11B resembles a hollow closed rectangular box with one open end 1022. The unibody molding of the covering case 1012 in accordance with the present invention provides a stronger and more lasting structure than for example the prior art embodiment of FIG. 1.

The perspective view of FIG. 11B shows the insertion of foam 1020 between the walls of the covering case 1012 and the area for the battery 1018. The circuit board 1014 can be mounted to the bottom of the covering case 1012 by gluing or in any other manner.

FIGS. 12A, 12B, and 12C illustrate a method and apparatus for forming a metal detector wand 1110 in accordance with the present invention. FIG. 12A shows a molded unibody structure 1105. This structure is a unibody in the sense that it is molded entirely in one piece, with the exception of a hole 1109. In accordance with a method of the present invention the molded unibody structure 1105 is cut along lines 1106 and 1108 to remove the center portion 1107. With the center portion 1107 removed the molded unibody structure is now separated into a handle portion 1116 and a coil portion 1114. The inner dimension, $C_I$, of the coil portion 1114 and the first outer dimension $B_o$, of the handle portion 1116 are preferably such that the handle portion 1116 fits inside the coil portion 1114. As shown in FIG. 12B preferably a battery 1130 is placed in the handle portion 1116 and a circuit board 1120 is placed in the coil portion 1114. Wires 1132 are used to connect the battery 1130 with the circuit board 1120. The circuit board 1120 may be mounted in any manner known in the art. FIG. 12C shows the handle portion 1116 and the coil portion 1114 connected together. In the embodiment of FIG. 12A–C, ridges 1150 are used to snap the two portions together. The two portions could also in some embodiments be screwed together. The joining area where the handle portion 1116 and the coil portion 1114 are joined together is much shorter that the joining area of the prior art such as shown in FIG. 1. The joining area of the handle portion 1116 and the coil portion 1114 is preferably orthogonal to the joining area of prior art devices such as shown in FIG. 1.

Figure 13:
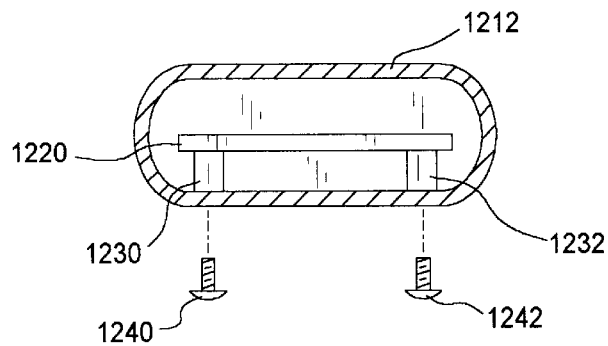
FIG. 13 illustrates a technique for mounting a circuit board to a covering case.

FIG. 13 illustrates a technique for mounting a circuit board 1220 to a covering case 1212. This technique can be used in conjunction with any of the previous embodiments. Screws 1240 and 1242 can be inserted through standoffs 1230 and 1232 and securely fashioned. The standoffs 1230 and 1232 are preferably glued to the circuit board 1220 or attached in another manner.

Figure 14B:
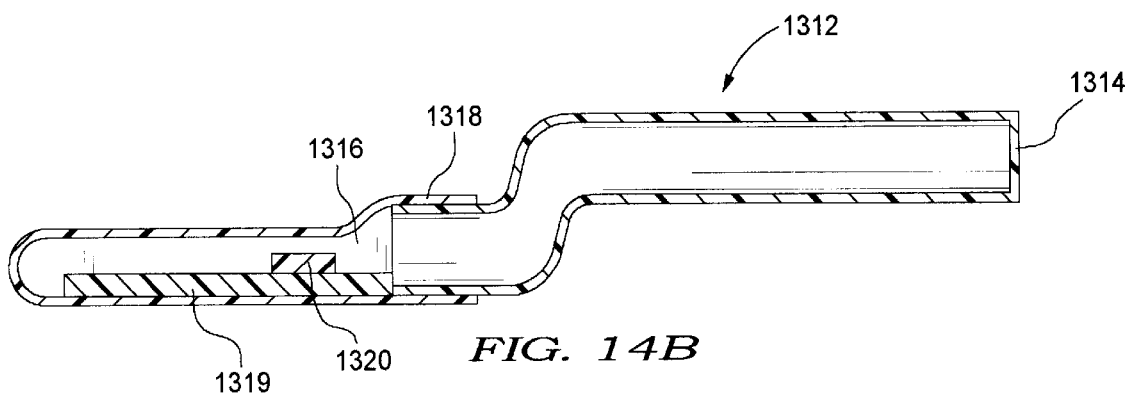
Figure 14D:
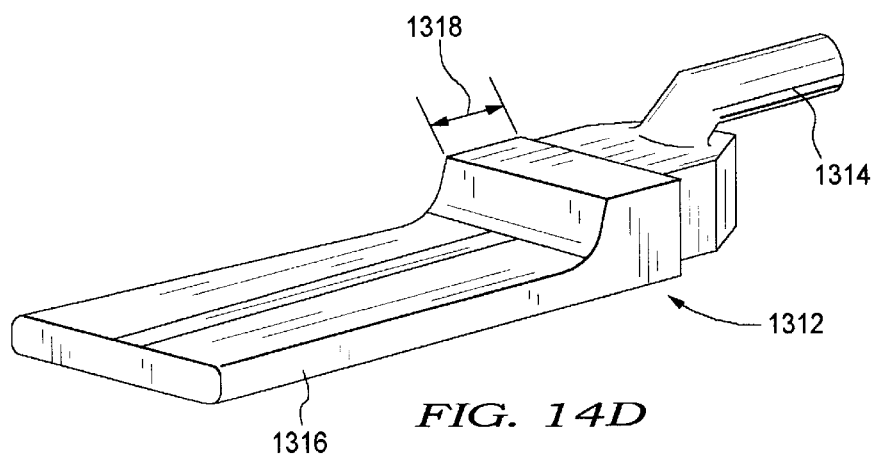

FIGS. 14A–D illustrate a method and apparatus for making a metal detector wand covering case 1312. FIG. 14A shows a unibody molded structure 1305. To create the covering case 1312, the unibody molded structure 1305 is cut along the lines 1306 and 1308, and the section 1307 is removed. A circuit board 1319 with preferably etched coil and electronics and an attached battery 1320 are inserted into a hollow coil portion 1316 as shown in FIG. 14B. A handle portion 1314 is then inserted into the coil portion 1316. As shown in FIG. 14B a section 1318 of overlap of the handle portion 1314 and coil portion 1316 occurs. The handle portion 1314 and coil portion 1316 are preferably glued, bolted, or screwed together at the overlap section 1318. A completed covering case 1312 comprising a unified handle portion 1314 and a coil portion 1316 is shown by FIG. 14C and 14D. FIG. 14C shows a top view and FIG. 14D shows a perspective view.

Figure 15A:
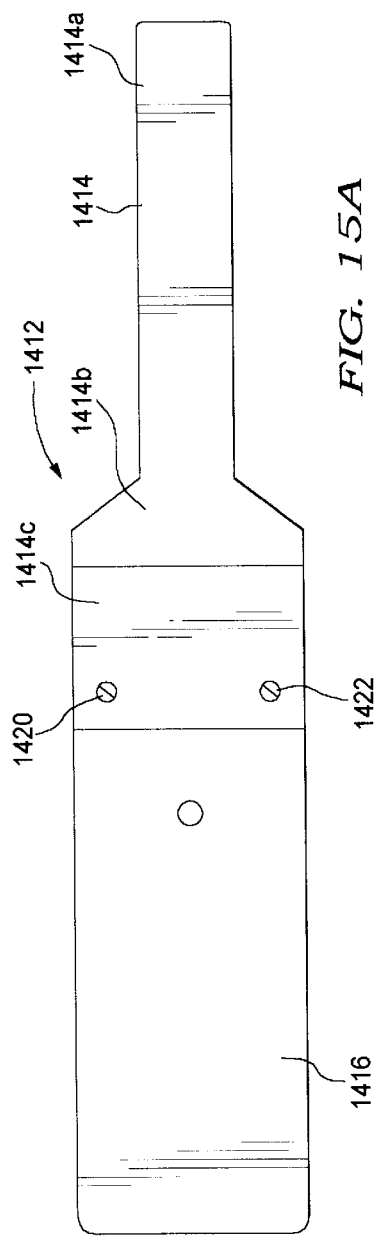
FIGS. 15A–C illustrate another embodiment of an apparatus and method for a covering case.
Figure 15B:
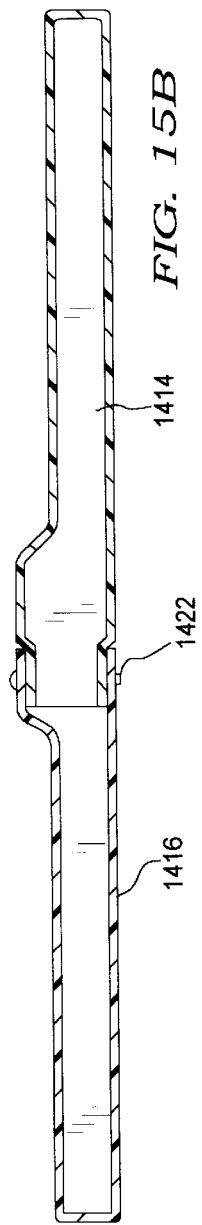
Figure 15C:
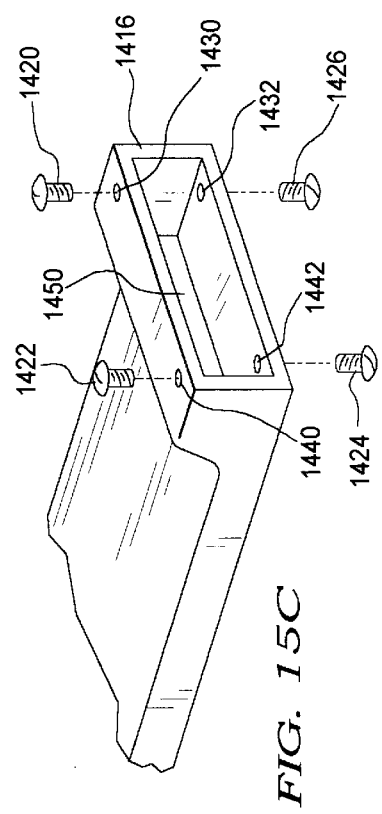

FIGS. 15A–C illustrates an apparatus and method for creating a covering case 1412. In this example a handle portion 1414 has three sections one of a thinner width 1414a, one portion of an increasing width 1414b, and one portion of a larger width 1414c. The handle portion 1414 is again inserted into the coil portion 1416. As shown in FIG. 15C, an opening 1450 is provided in the coil portion 1416, into which the handle portion 1414 is inserted. After the handle portion 1414 has been inserted into the coil portion 1416, the two portions can be secured in any manner, such as by screws 1420 and 1422 through holes 1430 and 1440, and screws 1424 and 1426 through holes 1442 and 1432, as shown in FIG. 15C, assumin the handle portion 1414 has been inserted into the coil portion 1416. In this embodiment the smaller width 1414a of the handle 1414 may be desirable for ease of manipulating a metal detector and for a lighter weight metal detector. Metal clamps may be used to sandwich the handle portion 1414 and the coil portion 1416 together.

We claim:

1. A method of making a metal detector comprising:

etching a coil onto a circuit board;

mounting detection circuitry on the circuit board;

and providing a housing surrounding the coil and the detection circuitry.

2. The method of claim 1 further comprising the step of:

etching shielding on the circuit board to shield body capacitance or RF noise.

3. The method of claim 1 wherein:

the detection circuity mounted on the circuit board is connected to a power source.

4. The method of claim 1 further comprising the step of:

applying shielding on the circuit board by painting.

5. The method of claim 1 further comprising the step of:

applying shielding on the circuit board by tape.

6. The method of claim 1 wherein:

the step of providing the housing includes providing a body portion and a handle wherein:

the body portion surrounds the circuit board; and the handle is provided with a smaller cross section than the body portion.

7. The method of claim 6 wherein:

the handle does not directly surround the circuit board.

8. A method of making a metal detector comprising:

etching a coil onto a first circuit board;

mounting detection circuitry onto a second circuit board;

and providing a housing surrounding the coil and the detection circuitry.

9. The method of claim 6 further comprising the steps of:

molding the body portion of the housing in one piece;

and inserting the circuit board into the body portion of the housing.

10. The method of claim 9 further comprising:

fixing the circuit board to the body portion of the housing.

11. The method of claim 1 wherein the housing is comprised of a body portion and a handle, the body portion and the handle being one and the same and the body portion and handle surrounding the coil.

12. The method of claim 1 further comprising:

providing digital detection circuitry.

13. The method of claim 6 further comprising:

providing a power source;

and providing an opening in the housing for both the insertion of the power source and the insertion of the circuit board.

14. The method of claim 1 further comprising:

providing the housing in at least two sections, a handle section and a body portion section.

15. The method of claim 1 further comprising:

making the housing by blowmolding.

16. The method of claim 1 further comprising:

making the housing by injection molding.

17. The method of claim 1 further comprising:

making the housing by extruding.

18. The method of claim 14 further comprising:

cutting a unibody mold into at least two pieces;

and reassembling the two pieces.

19. A metal detector apparatus comprising:

a coil;

a circuit board;

detection circuitry mounted to the circuit board;

wherein the detection circuitry is comprised of:
       a warning circuit,
       a power source,
       a housing surrounding and protecting the coil, and the circuit board, the housing comprising a handle;

wherein the coil is comprised of windings which are supported in at least one plane by the circuit board so that the windings are spread out substantially uniformly from the center of the circuit board to the periphery of the circuit board.

* * * * *